July 10, 1962   E. O. HENRIQUES ETAL   3,043,332
GAS CONTROL UNIT
Filed Aug. 14, 1958
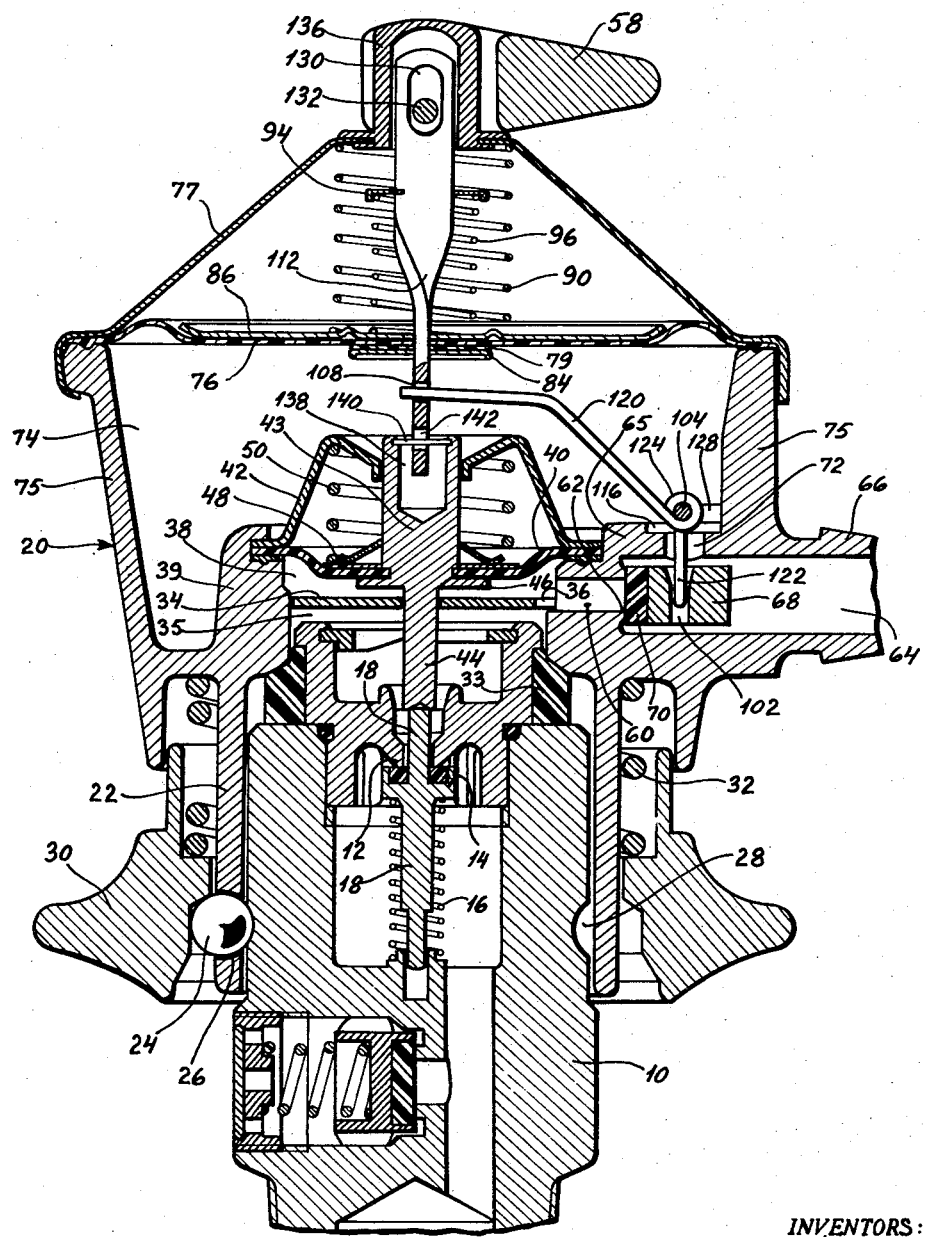
INVENTORS:
Eric Oscar Henriques
and Henning Olund Rasmussen,
BY
Ernest R. Marunowski,
Their Attorney.

United States Patent Office 3,043,332
Patented July 10, 1962

3,043,332
GAS CONTROL UNIT
Eric Oscar Henriques and Henning Ölund Rasmussen, Nivaa, Denmark, assignors to A/S Kosangas, Copenhagen, Denmark, a company of Denmark
Filed Aug. 14, 1958, Ser. No. 755,022
5 Claims. (Cl. 137—484.4)

This invention relates to a gas control unit for bottled gas installations. In such installations normally is used liquified petroleum gas, such as propane or butane, which is stored in portable cylinders, tanks or the like gas containers.

For obtaining the best possible economy and security of a gas-consumption device, for example, a gas stove, the gas ought to be supplied to the gas-consumption device under a pressure as uniform as possible.

In bottled-gas installations this consumer-pressure has to be maintained even if the pressure in the gas cylinder or a like gas container fluctuates very much in dependency of the kind of gas used, of the degree of filling of the container, and of the temperature of the container. Thus in bottled-gas installations for households the gas pressure in the gas cylinder can vary between an over-pressure of abt. 10 at. and a pressure only very little above 1 at.

In many bottled-gas installations the consumer-pressure is regulated by means of a reduction valve fitted behind a relief valve on the gas cylinder. These normally used reduction valves have characteristics of such a nature, however, that the consumer-pressure is greatly reduced when the pressure in the gas cylinder decreases, and further the consumer-pressure also fluctuates considerably in dependency of the gas consumption. Provided a relatively constant consumer-pressure has to be maintained by such installations it is necessary to adjust the reduction valve, which is, however, very often left undone.

Bottled-gas installations are known too, by which the valve fitted within the outlet of the gas cylinder is adjusted by means of a diaphragm operated pressure regulator mounted above the discharge opening, the diaphragm spring of which regulator influences on the valve for opening the same by pushing the valve member downwardly towards the interior of the gas cylinder. Such a pressure regulator involves normally considerable minor fluctuations of the consumer-pressure in dependency of the pressure within the gas cylinder than the reduction valve stated above, but even by such pressure regulators the consumer-pressure will vary in dependency of the gas consumption.

Further it is known in order to obtain the most constant consumer-pressure by such installations to use a two-stage-reduction-valve comprising a high pressure unit corresponding to the gas pressure control device described just above, from which unit the gas, the pressure of which by this unit is reduced to a value somewhat higher than otherwise is the case by such reduction valves, is supplied to a low pressure unit mounted above the high pressure unit and comprising a diaphragm operated valve member. Through the last said valve the gas flows into the diaphragm gas chamber of the low pressure unit, i.e. the chamber within which the gas acts upon the diaphragm. From said chamber the gas flows into a gas discharge pipe or a gas discharge nozzle.

It has proved that such a two-stage reduction valve is able to maintain an almost constant consumer-pressure independent of even very great variations of the pressure within the gas cylinder, but only provided a constant gas consumption, since even by such reduction valves the consumer-pressure will fluctuate in dependency of the gas consumption and in such a manner that the consumer-pressure decreases when the consumption increases. These fluctuations of the consumer-pressure may certainly be avoided provided diaphragms with very great areas exposed for the gas pressure are used, but diaphragms of such a size demand so great dimensions of the valve casing that they are inapplicable in practice.

An object of the invention is to provide a gas control unit which is able under application of relatively small diaphragms substantially to maintain an almost constant consumer-pressure independent of variations in the gas cylinder pressure and in the consumption.

Another object of the invention is to provide such a gas control unit which has also relatively small outer dimensions so that it is possible to replace older single reduction valves with a gas control unit according to the invention without this new gas control unit requiring more space than the old one.

A further object of the invention is to provide a gas control unit including a high pressure unit and a low pressure unit which without requiring more space than previously known single reduction valves or regulators are able to maintain a consumer-pressure essentially independent of the gas cylinder pressure as well as of the amount of consumption.

A still further object of the invention is to procure a gas control unit which is efficient but nevertheless cheap and simple to make.

Another object of the invention is to procure such a gas control unit with relative small diaphragms, the diaphragm springs of which do not demand an accurately calibrating.

Another object of the invention is to provide a gas control unit including a high pressure unit and a low pressure unit by which the latter being positioned above said high pressure unit, but nevertheless it is possible in a simple way by means of a control member on the top of the gas control unit to influence on the high pressure unit for the closing of the high pressure valve cooperating therewith.

A still further object of the invention is to provide a gas control unit of this last said kind by which it is possible by means of the control member to close not only the high pressure valve cooperating with the high pressure unit, but also the low pressure valve of the low pressure unit.

Other objects and advantages will be apparent from the following detailed description in conjunction with the accompanying drawing, in which The single view is a vertical sectional view of an embodiment of the invention.

In the drawing 10 represents a valve fitting which is intended for being secured in the upper end of a gas container. This fitting 10 does not constitute any part of the present invention and will, therefore, not be described in detail, but it is described in our co-pending patent application Ser. No. 749,283 filed on July 17, 1958. For the purpose of the present invention it should only be necessary to state that the fitting 10 includes a discharge valve seat 12, a valve member 14 placed below the valve seat, and a valve spring 16 tending to push the valve member 14 upwardly against the valve seat 12 for closing the valve. Valve member 14 is connected to a valve spindle 18 extending upwards through the upper part of the fitting 10.

On the fitting 10 a casing 20 for a two-stage pressure regulator is mounted. This casing 26 is provided with a collar 22 pushed down round the fitting 10 and secured hereto by means of balls 24 mounted in openings 26 in the collar 22. By means of a sleeve 30 mounted round the collar and pressed downwards by means of a spring 32 the balls 24 are forced to engage a corresponding groove 28 provided in the outer side of the fitting 10. A sealing ring 33 on the upper end of the fitting 10 secures an air tight connection between the casing 20 and the fitting 10.

Within the casing 20 above the collar 22 there is provided a high pressure gas chamber 35, 38 surrounded by a cylindrical wall 39 within the casing 20. This chamber is by means of a guard plate 34 divided in an upper diaphragm chamber 38 and a lower chamber 35. The guard plate 34 is provided with at least one opening 36 providing connection between the lower chamber 35 and the diaphragm chamber 38. The diaphragm chamber 38 is upwardly covered by a high pressure diaphragm 40 which is secured in position by means of a diaphragm casing 42 wedged on the wall 39.

Through the diaphragm 40 extends a diaphragm member 43 air tightly connected to the same. Below the diaphragm 40 this diaphragm member 43 is provided with a disc 46 abutting the under side of the diaphragm 40. From the disc 46 a spindle 44 extends downwardly. The lower end of spindle 44 abuts in the working position shown of the gas control unit the upper end of the valve spindle 18 so that the high pressure valve member 14 is controlled by the diaphragm 40.

Between a diaphragm disc 48 abutting the upper side of the diaphragm 40 and the upper end of the diaphragm casing 42 is inserted a diaphragm spring 50 surrounding the diaphragm member 43.

From the high pressure gas chamber 35, 38 the gas can flow through a gas passage 60 provided in the wall 39. Passage 60 opens through a valve seat 62 into a gas passage 64 forming a continuation of the passage 60 but having a somewhat greater diameter than the latter. The wall 65 of this gas passage 60, 64 continues into an outlet nozzle 66 on the casing 20.

Within the passage 64 a lengthy valve member 68 is reciprocably mounted. This valve member is provided with a sealing disc 70 intended for abutting the valve seat 62 to form a low pressure valve.

Opposite the valve member 68 the upper part of the wall 65 is provided with a connecting opening or channel 72 opening into a low pressure gas chamber 74 provided inside the outer wall 75 of the casing 20. Said gas chamber is downwardly closed by means of the wall 65 and the high pressure diaphragm 40 and upwardly closed by means of low pressure diaphragm 76. The latter is at its circumference wedged on and secured to the upper edge of the wall 75 by means of a diaphragm casing 77 constituting the upper part of or a cover for the casing 20. Within the diaphragm casing 77 a low pressure diaphragm spring 90 is mounted inserted between the upper part of the casing 77 and a diaphragm disc 86 abutting the upper side of the diaphragm 76.

A connecting means is provided between the low pressure diaphragm 76 and the valve member 68, and includes a control member or rod 112, and a double lever 120, 122. The control rod 112 extends slidably through the diaphragm 76 which at its center is provided with a thickening 79. Below the thickening 79 a disc 84 is air tightly connected to the rod 112. This disc 84 is normally pressed against the lower side of the diaphragm thickening 79 by means of a safety spring 96 which enclosing the rod 112 is inserted between the diaphragm disc 86 and spring retainer 94 secured to the rod 112. Provided the pressure within the gas chamber 74 exceeds a given value, the pressure will cause the diaphragm 76 to move upwardly overcoming not only the pressure from the diaphragm spring 90 but also the pressure from the safety spring 96 so that the diaphragm is lifted above the disc 84 and the gas can escape through the opening in the diaphragm 76 through which the rod 112 extends. Under all other circumstances the rod 112 can be considered secured to the diaphragm 76.

Below the disc 84 the rod 112 is provided with a hole 108 engaging the end of one lever arm 120 of a springy angle lever 120, 122, the other arm 122 of which extends downwardly through the connecting channel 72 into a hole 102 in the low pressure valve member 68. The lever 120, 122 is produced by bending a spring wire so that it is provided with an eye 124 by means of which the angle lever 120, 122 is pivoted on a pin 104 extending between inside projections 128 on the casing wall 75.

The preferably doubled spring wire used for the angle lever 120, 122 has such a rigidity that the lever bends only when influenced by stresses greater than the stresses performed by the low pressure diaphragm 76 for controlling the valve member 68.

The control rod 112 is at its upper end provided with an oblong opening 130 through which extends a pin 132. This pin 132 is eccentrically secured to a control lever or handle 58 which pivotably through an angle of 180° is connected to a top member 136 at the upper end of the casing 77. When the handle 58 is in the inactive position shown corresponding to functioning of the gas control unit, the pin 132 is positioned a distance from both ends of the opening 130 so that the control rod 112 is able to reciprocate within the limits given by the ends of the opening 130. At this position of the handle thus the pin 132 is not able to prevent said reciprocation of the rod 112 and consequently it is not able to influence the control movements of the low pressure diaphragm 76. On the contrary, when the handle 58 is turned about 180° to the closing position or inactive position, the pin 132 will abut the upper end of the opening 130 and consequently force the control rod 112 upwardly. Hereby first the springy angle lever 120, 122 will be pivoted clockwise until the valve member 68 abuts the valve seat 62, and then the springy angle level will act like a spring which is tensioned so that the valve member 68 yieldingly is pressed against the valve seat 62 with a relatively strong force ensuring tightness of the low pressure valve 62, 68.

The lower end of the control rod 112 extends downwardly into a bore 138 in the upper end of the diaphragm member 43. A pin 140 secured to the diaphragm member 43 and extending across the bore 138 engages an oblong slot 142 in the lower end of the rod 112. This opening is so positioned that in the operative position of the gas control unit shown, the pin 140 is positioned at a distance from both ends of the slots 142 so that the control rod 112 cannot influence the control movements of the diaphragm member 43 and the high pressure diaphragm 40 for the control of the high pressure valve member 14 within the fitting 10.

On the contrary, when the handle 58 is pivoted to the above stated closing position, as previously described, the control rod will be moved upwardly whereby the lower end of the slot 142 abuts the pin 140. This causes the diaphragm member 43 to be forced upwardly whereby the lower end of the spindle 44 is moved away from the upper end of the valve spindle 18. Consequently, the valve member 14 will be forced upwardly by its valve spring 18 and close the high pressure valve within the fitting 10.

The handle 58 is thus in driving connection with the rod 112 through a lost motion connection of the pin 132 and the oblong opening 130, and the rod 112 is connected to the diaphragm member 43 through a lost motion connection of the pin 140 and slot 142. Upon actuation of the handle 58, both regulating valves 12, 14 and 62, 68 are brought to a close position.

In the closing position of the handle 58 thus the high pressure valve 14, 18 as well as the low pressure valve 62, 68 are forcibly closed and for securing this only one single member, the control rod 112, needs to be manipulated.

The gas control unit shown in FIG. 3 operates in the following manner:

The high pressure diaphragm 40 is influenced partly by the intermedate pressure within the high pressure gas chamber 35, 38, partly by the low pressure within the low pressure gas chamber 74 which latter pressure fairly corresponds to the pressure within the gas passage 64. Therefore the high pressure diaphragm 40 will co-operate with the discharge valve 12, 14 of the gas container and thereby try to maintain an intermediate pressure within the chamber 35, 38 having a constant overpressure over the pressure within the passage 64.

The low pressure diaphragm 76 is influenced partly by atmospheric pressure, partly by the pressure within the low pressure gas chamber 74, last said pressure being fairly the same as the pressure within the gas passage 64. The pressure within the gas chamber 74 will be, however, somewhat smaller than the static pressure within the passage 64 owing to the venturi effect caused by the flowing of the gas along the valve member 68 past the connecting channel 72. It can be shown that thereby there is obtained such a pressure influence on the low pressure diaphragm 76 that this diaphragm without having a too great diameter is able by its co-operation with the low pressure valve 62, 68 to maintain a very constant low pressure within the gas passage 62 independent of the gas consumption.

While we have described specific embodiments of our invention it is to be understood that various changes may be resorted to without departing from the spirit of our invention, as expressed by the subjoined claims.

We claim:
1. A gas control unit, for use in connection with a container for bottled gas having a discharge valve, comprising in combination, a casing having an entrance adapted to receive high pressure gas, and having an outlet spaced apart from said entrance, said casing defining on its interior a high pressure gas chamber intercommunicating with said entrance, a low pressure gas chamber, a gas passage interconnecting said gas chambers and intercommunicating with said outlet, a high pressure first diaphragm disposed within said casing closing one side of said high pressure gas chamber, a high pressure valve spindle connected to said first diaphragm and reciprocably movable therewith between opposite opening and closing positions, a first spring disposed in said casing biasing said first diaphragm and valve spindle to said opening position, a low pressure second diaphragm disposed in said casing closing one side of said low pressure gas chamber, said gas passage including a valve seat, a valve member reciprocably movable in said gas passage forming with said valve seat a low pressure valve, movable connecting means establishing a driving connection between said second diaphragm and said valve member, a second spring disposed in said casing biasing said second diaphragm to a normal position wherein said connecting means will open said low pressure valve, whereby said low pressure valve will normally be open permitting gas to flow through said passage and, respectively, an increase in gas pressure prevailing in said low pressure gas chamber sufficient to overcome the biasing force of said second spring will act upon said second diaphragm to operate said connecting means to close the low pressure valve, a handle member movable between active and inactive positions, said connecting means including a movable control member connected to said second diaphragm and means including a lost motion device interconnecting said two diaphragms, and a lost motion connection between said handle member and said control member, said lost motion connection and device affording limited movement of both diaphragms free from motion transmission to each other when said handle member is in the inactive position, and actuation of said handle to the active position operating to move said connecting means against the power of said springs.

2. A gas control unit as stated in claim 1, said two diaphragms being positioned coaxially to each other.

3. A gas control unit, as claimed in claim 1, said control member including a rod having a bore; said connecting means including a member engaging said bore; said lost motion device including an elongated opening defined in said rod and a diaphragm member connected to said high pressure diaphragm; said diaphragm member being provided with a transverse stud; and said stud engaging said elongated opening.

4. A gas control unit, as claimed in claim 1, said control member including a rod having a bore; said connecting means including a member engaging said bore; said lost motion device including a diaphragm member connected to said high pressure diaphragm and an elongated slot defined in said rod, said diaphragm member having an axial opening which opens into said low pressure gas chamber, said rod extending into said opening, said diaphragm member being provided with a stud extending through said elongated slot and traversing said opening, said elongated slot having an axial extension greater than the dimension of said stud in said axial direction; said stud engaging said elongated slot at the ends thereof.

5. A gas control unit for bottled gas installations, comprising in combination: a casing having an inlet and an outlet; said casing defining a high pressure gas chamber communicating with said inlet, a low pressure gas chamber, and a gas passage establishing a connection between said high pressure gas chamber and said outlet; a high pressure diaphragm disposed within said casing closing said high pressure gas chamber at one side; a high pressure valve spindle axially displaceable within said high pressure gas chamber and connected to said high pressure diaphragm; said high pressure valve spindle being movable between first and second positions; a high pressure diaphragm spring inserted in said casing and acting upon said high pressure diaphragm thereby biasing said high pressure diaphragm in direction of said high pressure chamber and said high pressure valve spindle in direction of the first position thereof, whereas an increase in gas pressure within said high pressure gas chamber sufficient to overcome the biasing force of said high pressure diaphragm spring will act upon said high pressure diaphragm for movement of said high pressure valve spindle towards the second position; a low pressure diaphragm within said casing closing said low pressure gas chamber at one side; said gas passage defining a valve seat; a valve member disposed within said gas passage cooperating with said valve seat to form a low pressure valve; said low pressure gas chamber and said gas passage being mutually connected between said valve seat and said outlet; connecting means operable for connecting said valve member and said low pressure diaphragm including at least one flexible member; a low pressure diaphragm spring inserted in said casing acting upon said low pressure diaphragm, thereby biasing said low pressure diaphragm in direction of said low pressure gas chamber to open said low pressure valve by means of said connecting means and said valve member, whereas an increase in gas pressure within said low pressure gas chamber sufficient to overcome the biasing force of the low pressure diaphragm spring will act upon said low pressure diaphragm for closing said low pressure valve; a control member connected to one of said two diaphragms and operable to force manually said low pressure diaphragm in valve closing direction; diaphragm connecting means forming a connection between said two diaphragms for assuring simultaneous movement of said high pressure diaphragm in a direction towards said second position and said low pressure diaphragm in valve closing direction by the manual forcing of the one diaphragm connected to said control member, said diaphragm connecting means including a lost motion device so operative that a limited movement of said one diaphragm may take place without influencing the other diaphragm.

References Cited in the file of this patent

UNITED STATES PATENTS

| | | |
|---|---|---|
| 1,903,248 | Spence | Mar. 28, 1933 |
| 2,002,884 | Deming | May 28, 1935 |
| 2,543,203 | Roney | Feb. 27, 1951 |
| 2,635,392 | Gratzmuller | Apr. 21, 1953 |
| 2,860,658 | Senesky | Nov. 18, 1958 |
| 2,940,468 | Drabik | June 14, 1960 |

FOREIGN PATENTS

| | | |
|---|---|---|
| 65,090 | Denmark | Nov. 4, 1946 |